No. 736,153. PATENTED AUG. 11, 1903.
F. A. REYNOLDS.
ATTACHMENT FOR HYDROCARBON BURNERS.
APPLICATION FILED JULY 11, 1902.
NO MODEL.
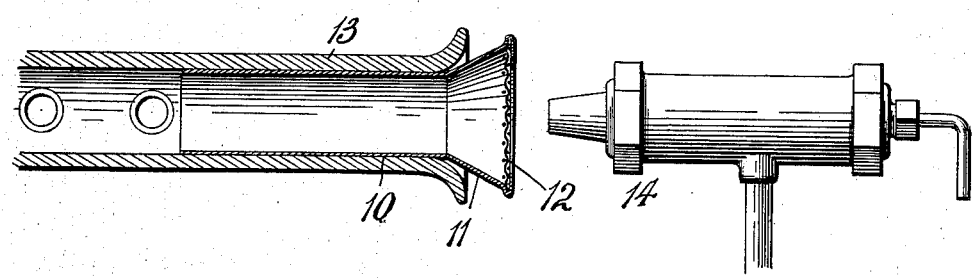
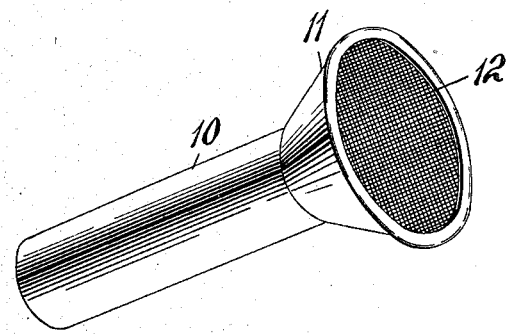
WITNESSES:
INVENTOR
Frank A. Reynolds.
BY
W. B. Hutchinson,
ATTORNEY No. 736,153. Patented August 11, 1903.

UNITED STATES PATENT OFFICE.

FRANK ARTHUR REYNOLDS, OF LEWISTON, MAINE, ASSIGNOR TO PHIPPS ROAD CAR COMPANY, OF JERSEY CITY, NEW JERSEY, A CORPORATION OF NEW JERSEY.

ATTACHMENT FOR HYDROCARBON-BURNERS.

SPECIFICATION forming part of Letters Patent No. 736,153, dated August 11, 1903.

Application filed July 11, 1902. Serial No. 115,121. (No model.)

*To all whom it may concern:*

Be it known that I, FRANK ARTHUR REYNOLDS, of Lewiston, Androscoggin county, Maine, have invented certain new and useful Improvements in Attachments for Hydrocarbon-Burners, of which the following is a full, clear, and exact description.

My invention relates to an improved attachment for hydrocarbon-burners, the object of which attachment is to cause the burners to burn with a steady flame.

My invention is intended to prevent popping of the burners, to prevent the flame from accidentally going out, and to prevent the flame from flushing back through the burner. I find by careful experiments that this can be accomplished by placing a screen of fine mesh between the mixer of an ordinary hydrocarbon-burner and the valve or nozzle which supplies the hydrocarbon vapor to the mixer. I find, too, that by affixing the screen to a light tube adapted to fit the mouth of the mixer the desired result can be accomplished and the apparatus or attachment can be very easily adjusted.

To these ends my invention consists of a burner attachment, which will be hereinafter described and claimed.

Reference is to be had to the accompanying drawings, forming part of this specification, in which similar figures of reference refer to similar parts throughout both views.

Figure 1 is a detail sectional view showing my improved attachment in position in the mixer of a burner and opposite the delivery-valve, and Fig. 2 is a detail perspective view of the preferred form of the attachment.

If a screen were placed over the mouth of a mixer, it would answer the purpose; but it is better to have the screen easily removable, so that the mixer can always be gotten out, and to this end I provide a tube 10, having a flaring mouth 11, over which is placed the screen 12, which should be of fine mesh. I have shown the tube 10 adapted to fit a tubular mixer 13; but obviously this part of the device should be suitable to fit the requirements of different forms of mixers, the object being to produce a detachable device which can be easily adjusted, so as to bring the screen between the mixer and the valve 14 or equivalent device for discharging the hydrocarbon vapor into the mixer. The apparatus as shown is simple, and I have proved by experiments that it serves the purpose, as the vapor will not burn back through a screen. Moreover, the screen has a tendency to finely divide the vaporized atoms, so that a much more perfect combustion results than would otherwise take place.

Having thus described my invention, what I claim as new, and desire to secure by Letters Patent, is—

The combination with a hydrocarbon-burner having a mixer, and a valve, of a tube having a flaring outer end and shaped to snugly fit the mixer and adapted to be slid therein and held in its adjusted position by its contact with the bore of the mixer whereby it is adjustable toward and from the valve, and a screen attached to and covering the flaring end of the tube.

In testimony whereof I have hereunto set my hand in the presence of two subscribing witnesses.

FRANK ARTHUR REYNOLDS.

Witnesses:
T. J. MURPHY,
JOHN L. READE.